(12) United States Patent
Wiltshire

(10) Patent No.: US 6,411,902 B1
(45) Date of Patent: Jun. 25, 2002

(54) SHALE COMPACTION AND SONIC LOGS

(76) Inventor: Michael John Wiltshire, 13 St Andrews Avenue, Mount Osmond 5064 (AU)

( * ) Notice: Subject to any disclaimer, the term of this patent is extended or adjusted under 35 U.S.C. 154(b) by 0 days.

(21) Appl. No.: 09/551,478

(22) Filed: Apr. 18, 2000

(30) Foreign Application Priority Data

Apr. 19, 1999 (AU) ............................................. PP9795

(51) Int. Cl.$^7$ ................................................. G01V 1/50

(52) U.S. Cl. ......................................................... 702/7

(58) Field of Search ............................. 702/6, 7, 8, 14, 702/12, 13; 324/338, 339

(56) References Cited

U.S. PATENT DOCUMENTS

| | | | | |
|---|---|---|---|---|
| 4,310,887 A | * | 1/1982 | Suau | 340/854.1 |
| 4,548,071 A | * | 10/1985 | Habiger | 702/12 |
| 5,615,115 A | * | 3/1997 | Shilling | 702/12 |
| 6,109,368 A | * | 8/2000 | Goldman et al. | 175/39 |

OTHER PUBLICATIONS

L. Stegena "The Structure of the Earth's Crust in Hungary", *Acta Geologica*, Budapest 8, pp. 413–431, 1964.

Westphal, Hildegard and Aigner, Thomas, "SeismicStratigraphy and Subsidence Analysis in the Barrow–Dampier Subbasin, Northwest Australi", *AAPG Bulletin*, vol. 81, No. 10, pp. 1721–1749, Oct. 1997.

Archie, G.E., "The Electrical Resistivity Log as an Aid in Determining Some Reservoir Characteristics", *Journal Petroleum Technology* 5(1), pp. 54–62, 1942.

Telford, W.M., Geldart, L.P., and Sheriff, R.E. *Applied Geophysics* (Second Edition), Cambridge University Press, Chapter 4, pp. 136–247, and Chapter 11, pp. 664–671, 1990.

Japsen, Peter, "Regional Velocity–Depth Anomalies, North Sea Chalk: A Record of Overpressure and Neogene Uplift and Erosion", *AAPG Bulletin* , vol. 82, No. 11, pp. 2031–2074, Nov. 1998.

Ward, R.W., and Hewitt, M.R., "Monofrequency Borehole Traveltime Survey", *Geophysics*, vol. 42, No. 6, pp. 1137–1145, Oct. 1977.

Heasler et al. "Analysis of Sonic Well Logs Applied to Erosion Estimates in the Bighorn Basin, Wyoming", *AAPG Bulletin*, vol. 80, No. 5, May 1996. pp. 630.646.

Westphal et al. "Lithofacies Prediction From Wireline Logs With Genetic Algorithms and Neural Networks", *E. Schweizerbartsche Verlagsbuchhandlung*, Dec. 1996. pp. 465–474.

Law et al. "Geologic Implications of Coal Dewatering", *The American Association of Petroleum Geologists Bulletin*, vol. 67, No. 12, Dec. 1983. pp. 2255–2260.

Gassmann, F. "Elastic Waves Through a Packing of Spheres", No Date.

Rudman et al. "Transformation of Resistivity to Pseudovelocity Logs", *The American Association of Petroleum Geologists Bulletin*, vol. 59, No. 7, Jul. 1975, pp. 1151–1165.

(List continued on next page.)

Primary Examiner—Donald E. McElheny, Jr.
(74) Attorney, Agent, or Firm—Merchant & Gould P.C.

(57) ABSTRACT

A method of calculating a theoretical sonic log from an ideal sonic log and resistivity data. The method involves calculating the ideal sonic log assuming a shale sediment and using available data from a well or the surrounding region. Resistivity data is used to correct the ideal sonic log for departures from the shale sediment assumption.

The calculated theoretical sonic log may then be used to calibrate an experimental log and to replace low confidence segments of the experimental log.

The method allows useful information to be derived for wells previously considered uneconomical.

17 Claims, 7 Drawing Sheets

OTHER PUBLICATIONS

Goetz et al. "An Investigation Into Discrepancies Between Sonic Log and Seismic Check Spot Velocites", No Date.

Benson et al. "A Modeling Solution for Predicting (a) Dry Rock Bulk Modulus, Rigidity Modulus and (b) Seismic Velocities and Reflection Coefficients in Porous, Fluid–Filled Rocks with Applications to Laboratory Rock Samples and Well Logs", *Journal of Applied Geophysics*, 41, 1999, pp. 49–73.

Alberty, M. "The Influence of the Borehole Environment Upon Compressional Sonic Logs", *the Log Analyst*, pp. 30–44. Jul.–Aug. 1996.

Raymer, L. "An Improved Sonic Transit Time–To–Porosity Transform", SPWLA Twenty–First Annual Logging Symposium, Jul. 8–11, 1980, pp. 1–12.

Issler, D. "A New Approach to Shale Compaction and Stratigraphic Restoration, Beaufort–Mackenzie Basin and Mackenzie Corridor, Northern Canada", *The American Associatino of Petroleum Geologists Bulletin*, vol. 76., No. 8, Aug. 1992. pp. 1170–1189.

Korvin, G. "Shale Compaction and Statistical Physics".

* cited by examiner

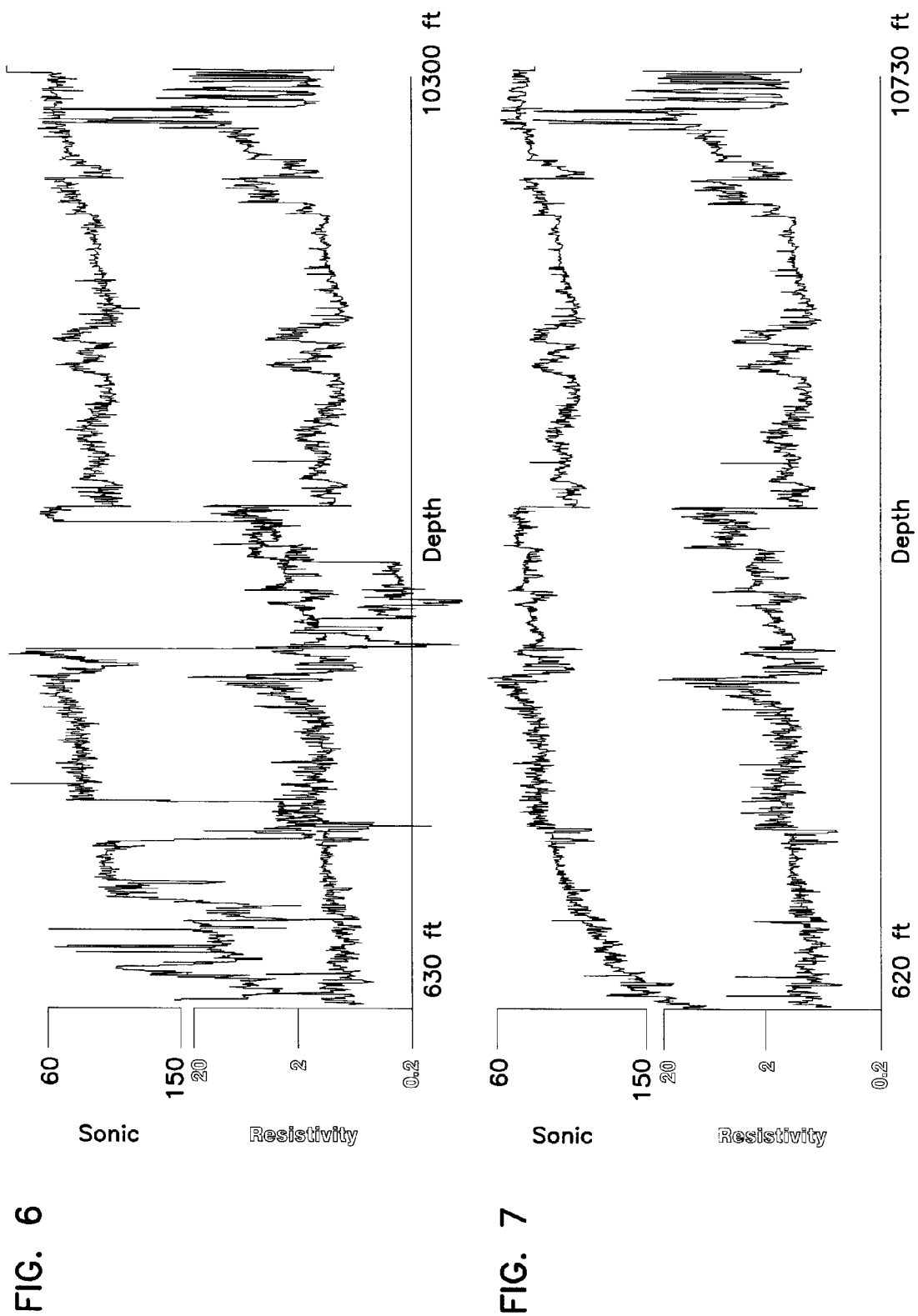

SHALE COMPACTION AND SONIC LOGS

FIELD OF THE INVENTION

The invention relates to a method of predicting acoustic wave performance in sediments. In particular, the invention relates to a compacted shale model and applications of the model to generate theoretical sonic logs useful in seismic studies. The model predicts acoustic velocity with depth (sonic log) and allows procedures such as sonic log editing and quality control.

Background Art

Acoustic wave propagation in sedimentary rock sequences, the subject of sonic logs, is of fundamental interest in petroleum exploration. It provides a key linkage between geophysical data acquisition and interpretation, and the rock properties which are of basic interest to geologists. Compression (and more recently shear) wave data are commonly acquired during borehole logging operations. These data are subsequently used in and are often critical to interpretation of rock properties, reservoir analyses, seismic interpretation and basin analyses.

The linkage between rock properties measured in boreholes and the interpretation of similar properties from seismic data is provided by measurements recorded in-situ by logging tools, and by detailed laboratory measurements on rock samples recovered during drilling. The properties of greatest interest in this process are acoustic performance (of both compression and shear waves) and bulk density. The borehole environment and logging process often adversely affect acquisition of good quality acoustic log data over substantial intervals of section, resulting in poor ties of well data to seismic, and inferior quality acoustic velocity data.

The quality of the borehole log data is often affected by petrophysical properties (fractures, compaction, hydrocarbon content), borehole environmental factors (mud properties, borehole surface conditions) and acquisition parameters (logging speed, signal generation and detection techniques). The data so acquired are calibrated by comparing the integrated borehole signal with independently measured interval velocity data (check-shot data). Misfit between integrated log data and check-shot data primarily arises because noise is commonly incorporated in the log signal, and because of different acoustic frequencies employed in the two techniques (Ward, R. W. and Hewitt, M. R., 1977, Monofrequency borehole travel time survey: Geophysics, 42, 1137–1145). Goetz et al (1979, An investigation into discrepancies between sonic log and seismic check-shot velocities: Australian Petroleum Exploration Association. J.. 19, 2, 131–141) provided a complete discussion of error sources of the two processes.

Corrections are applied to the borehole data to force a fit to the check-shot data, and the emergent calibrated sonic log is then used as input to further studies, particularly seismic modelling. The tie of well data to seismic, and the interpretation of seismic character of sedimentary packages (seismic stratigraphy) is fundamental to interpretation of basic structural evolution, the history of deposition and present geometry.

Sonic signal degradation, particularly in near-surface and less compacted rocks, often leads to substantial editing being required before the integrated signal agrees acceptably with the check-shot data. Lack of a suitable technique (both in terms of physical modelling and operational efficiency) for systematic noise removal and editorial replacement of intervals of suspect data has hitherto resulted in linear interpolation being the most commonly used method of noise removal from the sonic log.

Under normal circumstances, in generally subsiding depositional basins, progressively increasing overburden load due to increasing depth of burial, results in sequence compaction, with porosity reduction, increased bulk density and improved acoustic propagation efficiency. Observation of sonic logs clearly shows a general increase in acoustic p-wave velocities of propagation with increasing depth of burial (Telford, W. M., Geldart, L. P., and Sheriff, R. E., 1990, Applied Geophysics, (Second Edition), Cambridge University Press). Exceptions exist, and are primarily lithology-dependent. Several recent papers have used various compaction models to quantify these changes, and to use the data for studies of basin evolution.

An exponential decay model for the density-depth function was proposed by Stegena, L. (1964, The structure of the earth's crust in Hungary, Acta Geologica, Budapest 8, 413–431), and Korvin, Gabor (1984, Shale compaction and statistical physics: Geophysical Journal of the Royal Astronomical Society, v. 78, p. 35–50) developed a mathematical proof of the exponential decay model for shale compaction. This model has not been widely used (Japsen, Peter, 1998, Regional velocity-depth anomalies, North Sea Chalk: a record of overpressure and Neogene uplift and erosion: AAPG Bulletin, v82, No 11, p. 2031–2074, Heasler, Henry P., and Kharitonova, Natalya A., 1996, Analysis of sonic well logs applied to erosion estimates in the Bighorn Basic, Wyoming: AAPG Bulletin, v. 80, No. 5. p. 630–646). Difficulties in the use of such a model arise from the often complex mix of lithologies and absence of observational data for most lithologies other than shale.

Japsen uses a segmented linear model for North Sea Chalk. Gassman, F., (1951, Ueber die elastizitat poroser medien: Natur. Ges. Zurich, Vierteljahrssch. V. 96, p. 1–23) introduced a physical model for compressional wave velocity in porous rocks, and this has been recently applied to quantify variations in sonic p-wave performance in sandstone reservoirs (Alberty, Mark, 1996, The influence of the borehole environment upon compressional sonic logs: The Log Analyst, v. 37, p. 30–44).

OBJECT OF THE INVENTION

It is an object of the invention to use data acquired in association with boreholes in an improved manner by means of mathematics based processing to generate synthetic sonic logs. It is a particular object of the invention to provide methods by which to overcome problems such as the defects in actual logs, which logs are often compromised by borehole engineering, environmental difficulties, and by operational considerations. More particularly, the invention may provide an improvement over the considerable post-acquisition editing and re-calibration of the sonic signal which has been required so as to yield acceptable agreement between integrated sonic and check-shot measured interval travel times.

Explanation of the Invention

A study of the existing methods of editorial calibration, and a consideration of the underlying physical and mathematical processes, has led to a re-examination of the physics and mathematics of compactive modelling, and to the development of methods of use as outlined hereinbelow.

Because sedimentary rock burial history determines density, applying the invention allows interpretation of rock velocity in terms of burial history (the depth z in equation 4 below).

Systematic response of p-wave propagation efficiency to progressively increasing compaction is approached by initial consideration of the response of a relatively pure lithology. A marine shale with low total organic carbon content, buried progressively but sufficiently slowly that a normal pore pressure gradient is maintained, is first considered.

Compaction algorithm.

An exponential decay model is used below (after Korvin, 1984), wherein the shale density ρ progressively changes with burial depth:

$$\rho(z) = \rho_\infty + (\rho_0 - \rho_\infty) e^{-kz} \quad (1)$$

where ρ(z) is the bulk density at depth z, k is a compaction constant, $_\infty$ & $\rho_0$ are respectively the bulk density at infinite depth and at the mudline and e is the exponential constant.

Boundary considerations yield clearly defined limits to the above. At the mud-line, as clastic debris (fragments of pre-existing rock) first accumulates, the newly deposited material will have a bulk density ($\rho_0$) similar to that of the water of deposition, that is, about 1.022 for seawater, and 1.000 for fresh water. Upon burial, initial consolidation is rapid, and bulk density increases accordingly. With increasing depth of burial, the density asymptotically approaches a limit ($\rho_\infty$) which is the upper limit of shale density—about 2.7 gm/cc. ie.

$$\rho(z) = 2.7 + (\rho_0 - 2.7) e^{-kz}$$

Solution for k is straightforward. This is best achieved by a least-squares best fit to data observed at a number of different depths. $\rho_0$ is established by consideration of depositional conditions, on geologic grounds. The constant k is the compaction constant, the larger the value of k, the more rapid the compaction (or vice versa). It is to some extent dependent on the geologic environment (particularly time and temperature). If depths are chosen in kilometers, and densities are expressed in normal units, according to Korvin, the value of k ranges from 0.28 km$^{-1}$ to 1.46 km$^{-1}$.

Similar compactive functional descriptors can be expected for other lithologies, though rock fabric variations and chemical stability considerations somewhat complicate the modelling process.

ACOUSTIC ALGORITHM.

An extension of the Korvin model to acoustic p-wave velocities, and the development of a practical technique to use this model to correct observed sonic data, follows.

Acoustic p-wave velocity profiles, measured by either move-out studies or by borehole acquisition techniques (acoustic logs and borehole check-shot surveys) show a similar trend of increasing velocity with depth. Because the rock sequences so measured are complex, velocity functions of various forms (though rarely exponential) have usually been developed to fit observed data, and provide the keys to time-depth conversion.

The velocity function for a normally compacted pure shale can be established as follows.

From an examination of wave theory (see, for example, Gorbachev, pp. 96–99)

$$Vp_z = \left[\frac{\lambda + 2\mu}{\rho_z}\right]^{\frac{1}{2}} \text{ and } Vs_z = \left(\frac{\mu}{\rho_z}\right)^{\frac{1}{2}} \quad (2)$$

where V is the velocity of sound and $V_p$ is the velocity of a p wave, $V_s$ is the velocity of shear wave, $V_{pz}$ is the velocity of a p wave at depth z, $V_{sz}$ is the velocity of an s wave at depth z, λ is the Lamé constant related to bulk modulus and μ the shear modulus.

Since initial interest is in p-wave behaviour, substitute Vp(z) into the relationship of Korvin, equation 1 above:

$$\frac{\lambda_z + 2\mu_z}{(Vp(z))^2} = \frac{(\lambda_\infty + 2\mu_\infty)}{Vp_\infty^2} + \frac{(\lambda_0 + 2\mu_0)}{Vp_0^2} - \frac{(\lambda_\infty + 2\mu_\infty)}{Vp_\infty^2} e^{-kz}$$

Now, for a single lithotype, λ and μ at limits are constants, so the above reduces to:

$$\frac{\lambda_z + 2\mu_z}{Vp(z)^2} = \frac{A}{Vp_\infty^2} + \left(\frac{B}{Vp_0^2} - \frac{A}{Vp_\infty^2}\right) e^{-kz} \quad (3)$$

where A and B are constants.

Now for sonic velocities the interval transit time is $$ITT = \frac{10^6}{Vp}$$

(ITT is the standard petrophysical abbreviation for Interval Transit Time, the inverse of sonic velocity), so substituting in the above:

$$\Delta T(z)^2 * (\lambda_z + 2\mu_z) = (A * \Delta T_\infty^2) + (B * \Delta T_0^2 - A * \Delta T_\infty^2) e^{-kz} \quad (4)$$

where ΔT(z) is the p wave interval transit time (ITT) at depth Z, $\Delta T_0$ is the ITT at the depositional surface, $\Delta T_\infty$ is the p-wave ITT at infinite depth.

Note that the constant k is precisely the same compaction constant as that derived for the density function above. Thus values of k derived from one set of observational data (eg. core data) can be applied in the other algorithm. Once k is determined, it can be used interchangeably in density and sonic algorithms. If the Lamé constants λ and μ can be determined, equation (4) can be used to solve for ΔT.

Within the single, progressively compacting lithotype model used above, sonic velocity is also observed to increase systematically with increasing depth of burial. This implies that the Lamé constants also change predictably and systematically. From boundary conditions solve $$Vp_z = \left[\frac{\lambda + 2\mu}{\rho_z}\right]^{\frac{1}{2}}$$

for (λ+2μ) at surface and at infinite (great) depth. At the mudline, λ+2μ=2.32*10$^6$ and at great depth, λ+2μ=70*10$^6$. The mixed term (λ+2μ) is referred to as the elasticity function.

APPLICATION TO WELL DATA.

In a well section, if we have prior or independent knowledge of k (e.g. from core density observation), and an acceptable value for ΔT in a clean shale lithology at a known depth, we can solve (4) above for (λ+2μ) at that depth. We can gather such data for a number of depths, and develop by interpolation a continuous function for (λ+2μ) with depth. This yields a method for computing ΔT with depth.

Under normal circumstances, for clean shale, compaction is irreversible. Departures from the clean shale compaction trend arise from the inclusion of non-shale materials. The most common of these, resulting in deviations from the normal compactive trend, including apparent undercompaction, are organic carbon and water, or a mix of other lithologies.

Abrupt departure from the normal shale compaction trend towards higher density and velocity is generally due to uplift and erosion of part of the overburden. Inclusion of abnormally dense material (eg complex iron compounds which occur in oolites in the Evergreen Formation in the Surat Basin) can have a similar effect, but these events are generally short-term, and readily recognised. Where a stepwise velocity increase persists, an erosional break can be inferred, and may be interpreted in quantitative terms.

The above argument is applied to a single, progressively compacting shale lithology. The model presumes that the changes in shale density are brought about by the process of compactive dewatering, with no significant changes due to other processes (e.g. chemical mineralogic adjustment). While it is probable that the model can be extended to other lithologies, it is suspected that chemical adjustments, responding to the effects of time, temperature and pressure on the bulk chemistry of each lithology, will significantly affect changes to $\lambda$ and $\mu$. Behaviour of the model will also break down if clay dewatering or other processes result in development of an abnormal pore pressure regime in the shale.

Real-world lithologic sequences generally comprise suites of genetically related lithotypes, deposited in a relatively regular manner. Systematic lithologic interpretation from wireline data, using a neural network approach, has been demonstrated (Westphal, Hildegard, and Bornholt, Stephan, (1996, Lithofacies prediction from wireline logs with genetic algorithms and neural networks: Zeitschrift der Deutschen Geologischen Gesellschaft, v. 147, no. 4, p. 465–474), Westphal, Hildegard and Aigner, Thomas, (1997, Seismic stratigraphy and subsidence analysis in the Barrow-Dampier subbasin, northwest Australia: AAPG Bulletin, v.81, No. 10. P. 1721–1749). If volumetric proportions and compactive behavior of each lithotype are known, the contribution of each lithotype to the formation acoustic performance might be computed.

i.e. $$\Delta T_{Fmn} = \sum_{i=1}^{n} V_i * \Delta T_i$$

where $\Delta T_{Fmn}$ is the formation ITT (mixed lithologies), $V_i$ is the volumetric proportion of lithotype i, and $\Delta T_i$ is the p wave ITT for lithotype i.

Within reservoir lithologies, porosity variations, which may or may not be systematic, are routine. Detailed analysis of lithotype mixes, and computation of p-wave signal contributions from each lithology, can be expected to only yield a relatively crude estimate of gross interval performance, particularly in complex reservoir lithologies, since only gross lithologic variations, not porosity variations, are defined by the present neural net approach.

Gassman (1951) established p-wave velocity dependence on porosity and density in clastic reservoir lithologies; however, a number of the inputs required to solve the Gassman equation are not routinely available with the precision required for our purposes (rock skeleton bulk and shear modulii, rock grain bulk modulus, interstitial fluid bulk modulus), so an alternative approach to adjustment of computed $\Delta T$ for porosity variations is used.

In most cases, an independent though indirect measure of porosity is available from the resistivity log. If pore fluid properties do not change markedly over a reasonable interval (as is generally the case within genetically related sediment packages not containing hydrocarbons), then the resistivity is a sensitive indicator of porosity variations and is described by the Archie relationship. (Archie, G. E., 1942. The electrical resistivity log as an aid in determining some reservoir characteristics, Journal Petroleum Technology 5(1) 54–62). If we use a resistivity device measuring over approximately the same interval as the sonic log, the resistivity data can be transformed to provide a short-interval porosity based modifier to the above composite compactive $\Delta T_{Fmn}$:

$$\Delta T_{Fmn} = \sum_{i=1}^{n} (V_i * T_i) + F(R)$$

where $V_i$ is lithotype volume $\Delta T_i$ is theoretical $\Delta T$ from equation (4) and F(R) is a function (transform) of resistivity.

The presumption here is that for mixed lithologies (mixed sufficiently finely that over the interval of investigation by the sonic tool, discrete layers are not resolved), each lithotype will have proportionate effect on the efficiency of p-wave signal propagation within the interval.

Because we generally lack sufficiently detailed data on the proportions of lithologic components present, this approach is impractical.

Instead, we simplify and generalise the model by regarding any mixed lithology as consisting of shale within which other lithotypes may be mixed or interbedded. Since both rock acoustic performance and electrical resistivity can be generally related to rock porosity (which is itself a function of rock density) we can write:

$$\Delta T_{Fmn} = F(\rho)$$

and $$R_t = F'(\rho)$$

Hence in general $$\Delta T_{Fmn} = F''(R_t)$$

Within pure shale $$\Delta T_{Shale} = F''(R_{Shale})$$

Taking differences and rearranging $$\Delta T_{Fmn} = \Delta T_{Shale} + [F''(R_t) - F''(R_{Shale})] \quad (5)$$

When applying this equation, we compute $\Delta T_{Shale}$ using the compaction based method detailed in equation (4) above, and compute the resistivity difference modifier $[F''(R_t)-F''(R_{Shale})]$ using well established petrophysical techniques. This method will now be described.

Formation Resistivity ($R_t$)

It is presumed that formation resistivity is available as a continuous depth function (a resistivity log).

Shale Resistivity ($R_{Shale}$)

Using general geologic interpretive principles, most probable intervals of cleanest (most nearly "pure") shale are identified on the resistivity log.

Shale resistivity is considered equivalent to the formation resistivity within these intervals. A continuous profile of shale resistivity is developed by interpolation between these intervals. In this manner an expected shale resistivity is established as a continuous function, whether or not any pure shale is actually present.

Functional relationships

The form of resistivity term F''($R_t$) is best established by analysis of Sonic-Porosity and Resistivity-Porosity relationships, and by analysis of observational data compared to computed data.

By analysis of relationships:
From Archie, $$\phi^m = aS^{-n}\frac{R_w}{R_t} \quad (6)$$

where $\phi$ is porosity, m, n and a are constants, S is saturation, $R_w$ and $R_t$ are respectively the resistivity of formation water and of formation.

The general presumption here is that the sequence is fully water saturated i.e. S=1, (see above), so the Archie equation reduces to:

$$\phi^m = a\frac{R_w}{R_t}$$

In equation (6) constants m and a are cementation and tortuosity factors, which have been the subject of considerable previous study, so their ranges and probable values may be estimated with reasonable confidence. $R_t$ is formation resistivity and $R_w$ is formation water resistivity, established by normal log analysis procedures.

But porosity may be directly computed from the sonic log, using either the Wyllie relationship $$\phi_{sonic} = \left(\frac{\Delta T - \Delta T_{ma}}{\Delta T_{fl} - \Delta T_{ma}}\right) \cdot \frac{1}{C} \quad (7)$$

(wherein $\phi_{sonic}$ is porosity computed from sonic ITT. C is a constant—typical range from 1.0 to 1.3 (Raymer, Hunt and Gardner, 1980))

or the Raymer-Hunt-Gardner transform:

$$\phi_{sonic} = C' * \left(\frac{\Delta T - \Delta T_{ma}}{\Delta T}\right) \quad (8)$$

where C' is a constant (typical value 0.625 to 0.7 according to Alberty (1996) (The influence of the borehole environment upon compression sonic logs; The Log Analyst 37(4) 30–44)).

or the Raiga-Clemenceau equation:

$$\phi_{Sonic} = 1 - \left[\frac{\Delta T_{ma}}{\Delta T}\right]^{\frac{1}{x}} \quad (9)$$

x typically ranges between 2.3 and 2.4 (Issler, 1992).

We now equate the porosity from the Archie equation to that derived from the various sonic transforms (equations 7, 8 and 9), and solve to express $\Delta T$ in terms of $R_t$.

Wyllie model:

$$\left[aS^{-n}\frac{R_w}{R_t}\right]^{\frac{1}{m}} = \left[\frac{\Delta T_{Fmn} - \Delta T_{ma}}{\Delta T_{fl} - \Delta T_{ma}}\right] \cdot \frac{1}{C}$$

from which follows:

$$F''(R_t) = \Delta T_{Fmn} = \Delta T_{ma} + C \cdot (\Delta T_{fl} - \Delta T_{ma}) \cdot \left(aS^{-n}\frac{R_w}{R_t}\right)^{\frac{1}{m}} \text{ and}$$

$$F''(R_{Shale}) = \Delta T_{Fmn} = \Delta T_{ma} + C \cdot (\Delta T_{fl} - \Delta T_{ma}) \cdot \left(aS^{-n}\frac{R_w}{R_{shale}}\right)^{\frac{1}{m}}$$

We substitute these two terms into the above mixed expression for formation $\Delta T$ (equation (5)) to reach the following:

$$\Delta T_{Fmn} = \quad (10)$$

$$\Delta T_{Shale} + C \cdot (\Delta T_{fl} - \Delta T_{ma}) \cdot (aS^{-n}R_w)^{\frac{1}{m}} \cdot \left[\left(\frac{1}{R_t}\right)^{\frac{1}{m}} - \left(\frac{1}{R_{Shale}}\right)^{\frac{1}{m}}\right]$$

Using similar logic, we develop from the Raymer-Hunt Gardner model $$\Delta T_{Fmn} = \quad (11)$$

$$\Delta T_{Shale} + \Delta T_{ma} \cdot \left[\frac{1}{\left(1 - \frac{1}{C'}\left(aS^{-n}\frac{R_w}{R_t}\right)^{\frac{1}{m}}\right)} - \frac{1}{\left(1 - \frac{1}{C'}\left(aS^{-n}\frac{R_w}{R_{Shale}}\right)^{\frac{1}{m}}\right)}\right]$$

and from the Raiga-Clemenceau model:

$$\Delta T_{Fmn} = \quad (12)$$

$$\Delta T_{Shale} + \Delta T_{ma} \cdot \left[\frac{1}{\left(1 - \left(aS^{-n}\frac{R_w}{R_t}\right)^{\frac{1}{m}}\right)^x} - \frac{1}{\left(1 - \left(aS^{-n}\frac{R_w}{R_{Shale}}\right)^{\frac{1}{m}}\right)^x}\right]$$

Hence the inventor finds that the general form of a synthetic sonic algorithm is:

$$\Delta T_{Fmn} = \Delta T_{Shale} + [F''(R_t) - F''(R_{Shale})] \quad (5)$$

where the resistivity terms are computed in the manner of equations (10), (11), and (12) above, and $\Delta T_{Shale}$ is computed from the compactive sonic theoretical algorithm defined above in equation (4).

Statement of the Invention

In one form, although it need not be the only or indeed the broadest form, the invention resides in a method of computing a theoretical sonic log including the steps of:

computing an ideal theoretical shale sonic log $\Delta T_{Shale}$; and correcting the ideal theoretical shale sonic log with measured resistivity data using the relation $\Delta T_{Fmn} = \Delta T_{Shale} + F(Res)$ where F(Res) is a selected resistivity function.

In a further form the method includes the steps of:

calculating a compactive constant k;

estimating a modulus function ($\lambda+2\mu$) as a function of depth using the constant k and reliable observations of interval transit time ($\Delta T$);

calculating the shale interval transit time $\Delta T_{Shale}$;

calculating a resistivity modifier term which is then added to the shale interval transit time The compactive constant k is suitably determined by using point density data to solve $$\rho(z)=\rho_\infty+(\rho_0-\rho_\infty)e^{-kz}$$

The point density data $\rho(z)$ may be derived from core measurements or log measurements.

The step of estimating the modulus function $(\lambda+2\mu)$ is suitably performed by solving $$\Delta T(z)^2 *(\lambda_z+2\mu_z)=(A*\Delta T_\infty^2)+(B*\Delta T_0^2 - A*\Delta T_\infty^2)e^{-kz}$$

by substituting with observed $\Delta T(z)$ at various z and interpolating between calculations.

The step of calculating the shale interval transit time $\Delta T_{sh}$ is performed by solving $$\Delta T(z) = \left[\frac{[(A*\Delta T_\infty^2) + (B*\Delta T_o^2 - A*\Delta T_\infty^2)e^{Ks}]}{(\lambda_s + 2\mu_s)}\right]^{\frac{1}{2}}$$

The step of determining shale resistivity is suitably performed by taking values of shale resistivity from a resistivity log, and interpolating between points of observation to yield a continuous estimate of shale resistivity.

Suitably the interval transit time is corrected using the transforms of resistivity defined in equations 10, 11 and 12 above.

In another form, the invention resides in a method of calibrating an acquired sonic log including the steps of:

computing an ideal theoretical sonic log $\Delta T_{Shale}$;

comparing the ideal theoretical sonic log to high confidence regions of the acquired sonic log;

modifying the ideal theoretical sonic log to correlate with said high confidence regions; and substituting the ideal theoretical sonic log for the acquired sonic log in regions other than the high confidence regions.

BRIEF DESCRIPTION OF DRAWINGS

FIG. 6 shows acquired sonic data for the Trulek 1 well;

FIG. 7 shows modelled sonic data for the well of FIG. 6;

List of Abbreviations and Terms a constant used in Archie equation
C compaction constant used in Wyllie equation
C' compaction constant used in Raymer-Hunt-Gardner equation
e exponential number
F functional operator
F' functional operator
F" functional operator
ITT interval transit time in microseconds per foot (inverse of $V_p$)
k constant used in exponent in Korvin compaction equation
m exponent in Archie equation—associated with cementation
n exponent in Archie equation—associated with tortuosity
Res resistivity
$R_{Fmn}$ resistivity of formation
$R_{Shale}$ resistivity of shale
$R_t$ true resistivity of formation ($=R_{Fmn}$)
V velocity of sound
$V_l$ volume of lithologic component
$V_p$ velocity of pressure wave (p-wave)
$V_s$ velocity of shear wave (s-wave)
$Vp_z$ velocity of p-wave at depth z
$Vs_z$ velocity of s-wave at depth z
z depth in kilometers
$\Delta T$ sonic interval transit time
$\Delta T_{Fmn}$ sonic interval transit time of formation
$\Delta T_0$ sonic interval transit time at initial depth
$\Delta T_\infty$ sonic interval transit time at infinite depth
$\Delta T_{(z)}$ sonic interval transit time at depth z
$\Delta T_{ma}$ sonic interval transit time of rock matrix
$\Delta T_{fl}$ sonic interval transit time of fluids in pore spaces
$\lambda$ Lame constant related to bulk modulus
$\mu$ Lame constant (shear modulus)
$\lambda+2\mu$ modulus function (mixed elasticity function)
$\lambda_o$ Lame bulk constant at initial depth
$\lambda_\infty$ Lame bulk constant at infinite depth
$\mu_\infty$ Lame shear constant at infinite depth
$\mu_0$ Lame shear constant at initial depth
$\phi$ porosity
$\phi_{sonic}$ porosity computed from sonic velocity
r bulk density
$\rho_b$ bulk density
$\rho_{b(z)}$ bulk density at depth z
$\rho_{(z)}$ bulk density at depth z
$\rho_\infty$ bulk density at infinite depth
$\rho_0$ bulk density at initial depth

DETAILED DESCRIPTION OF THE INVENTION

Acoustic logging devices generate an outgoing acoustic pulse, part of which, after travelling for some distance through the rocks in the near vicinity of the borehole, re-enters the borehole and is detected by a sensor array (Tittman, 1986; Schlumberger, 1989). The elapsed time between transmission and detection is then interpreted in terms of rock acoustic velocities. While the derived rock properties are influenced by various factors (including the travel path of the detected wavefront, borehole geometry rock framework and fluid properties, fluid invasion in the near-borehole environment, and pore fluids in the uninvaded rocks) correct identification of the incoming signal is a fundamental pre-requisite.

Figure 1:
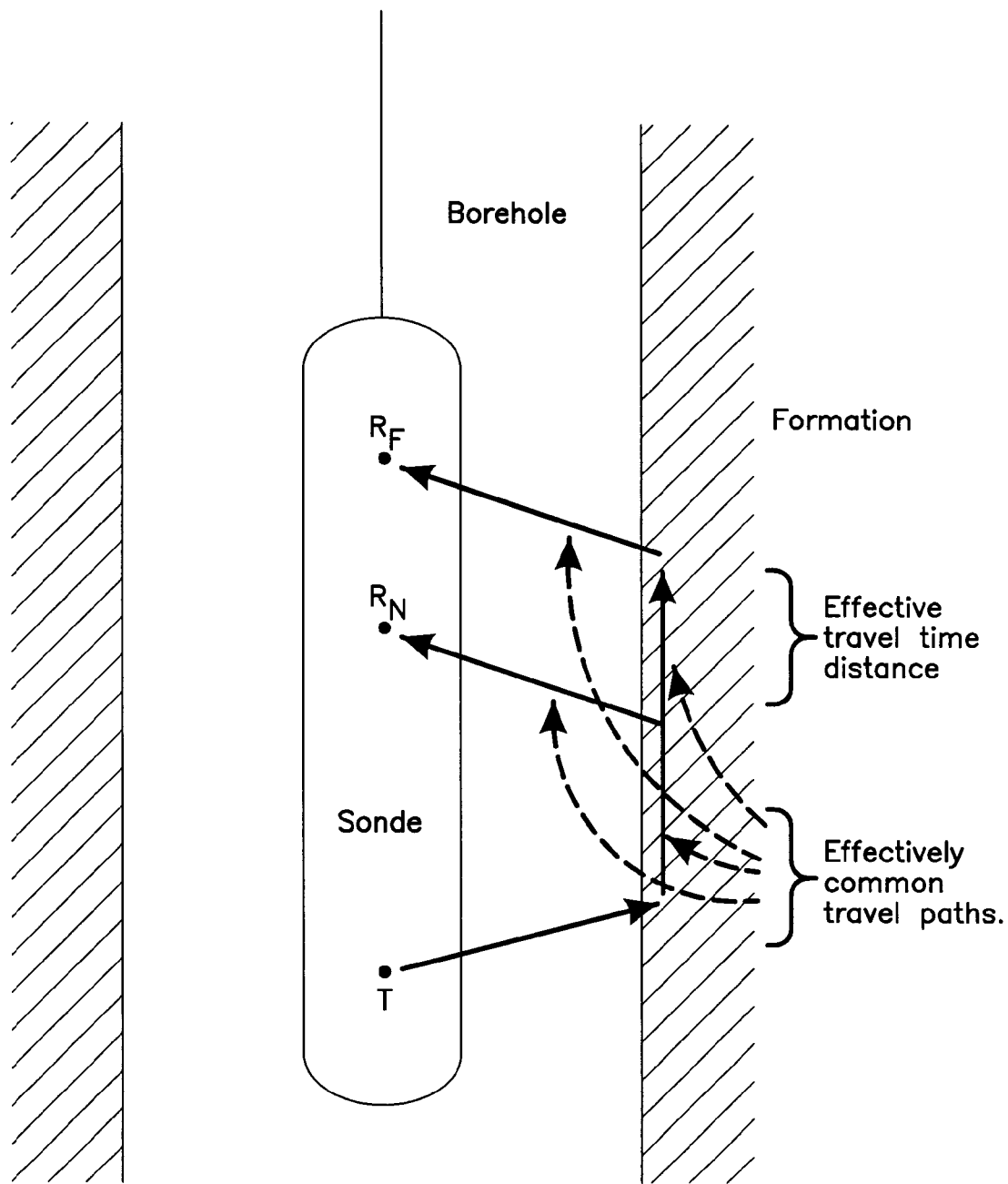
FIG. 1 is a schematic of a sonic logging system.
Figure 2:
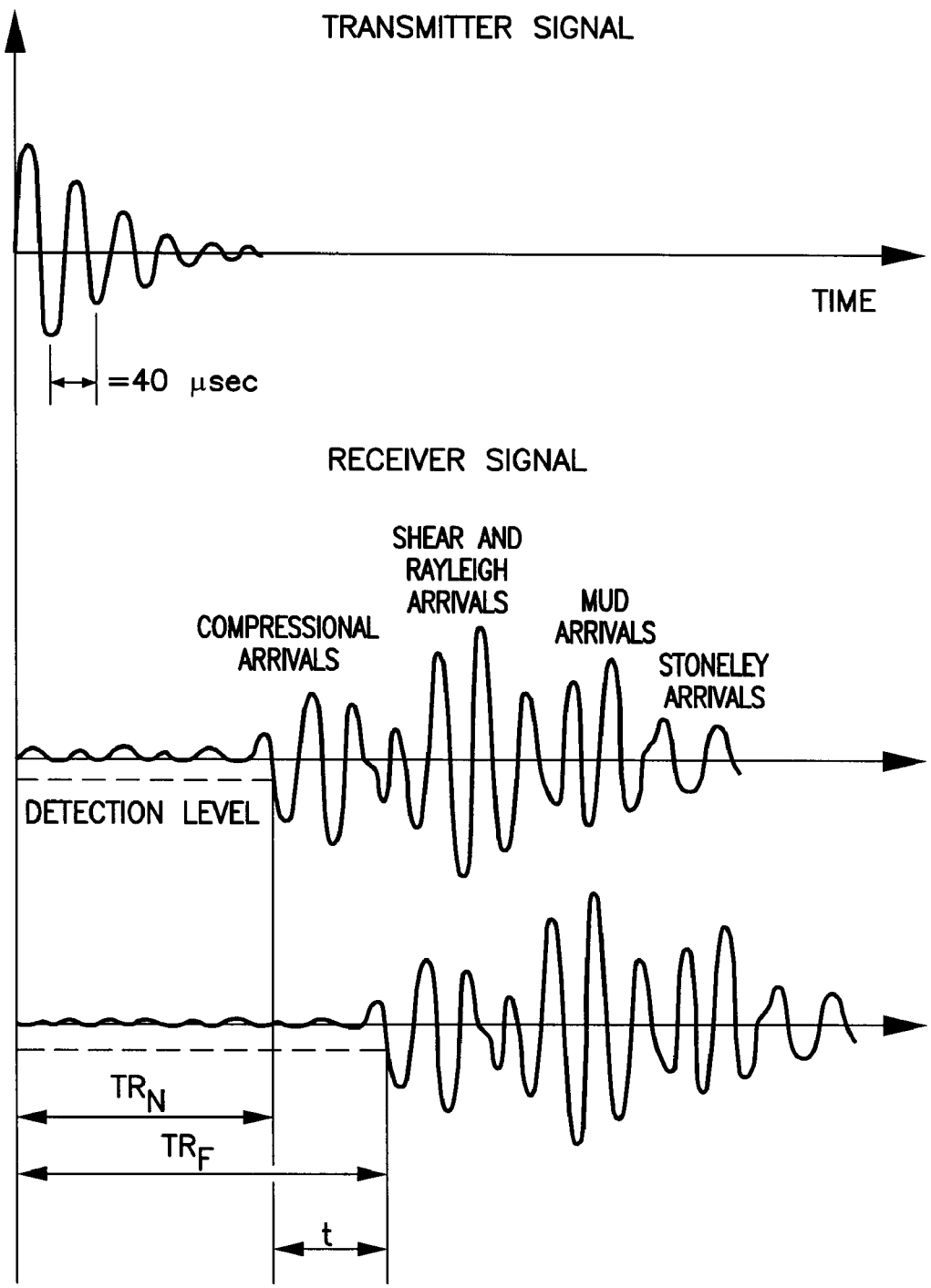
FIG. 2 is a schematic of the signals received by a near receiver and a far receiver in a centralized two-receiver sonic sonde.

Since acoustic data is acquired with a moving logging sonde (FIG. 1), noise arising from contact between the logging sonde and cable, and the borehole wall is generally present in the logging environment, and successful acoustic log data acquisition requires differentiation of the incoming acoustic wave from the noise. This is generally achieved by amplitude-based detection within a discrete time range. Cutoffs are set such that the desired incoming wave energy exceeds the background noise (FIG. 2). Upon wavefront arrival, detection is triggered and the transit time for the passage of the wave from source to detector is recorded. The process is repeated many times per second and a continuous record of transit time versus depth in the borehole results as the logging sonde travels up the borehole.

Whenever the incoming signal is incorrectly identified, an erroneous instantaneous transit time results, identified often as 'spiking' on the transit log. In acoustic logging, this most commonly arises when noise momentarily overwhelms the incoming signal, resulting in the detector failing to identify the first arrival, and subsequently responding to the arrival of a later wavefront (which may have travelled entirely within the borehole fluid column). Events of this nature may be related to high noise events, but more frequently result from borehole factors causing significant attenuation of the acoustic signal (e.g. gas in the borehole fluid) or by rock features causing attenuation (e.g. fractures or poor compaction). In the case of poor compaction, the efficiency of acoustic transmission is reduced and, if background borehole noise is relatively constant, noise may overwhelm the desired signal. Such conditions may persist over significant intervals of hole.

The above equations can be applied in numerous ways to better quantify the acoustic performance of the sedimentary sequence. A particular concern in the present invention is the application to sonic log calibration.

With a sonic log of variable quality, the person skilled in the art can usually recognize intervals where the sonic signal acquisition and interpretation has resulted in a geologically and geophysically reasonable outcome, where the sonic signal appears reliable, and intervals where the converse is true. The main cause of mismatch between integrated sonic times and check-shot interval times is generally systematic signal misinterpretation (e.g. cycle skipping) over discrete intervals of the hole, and the objective is to replace the acquired signal across these intervals with a theoretical signal which honours the above compactive theory.

An approach in the present invention is to use a single shale lithology as the compactive key, and to use the resistivity data as a general modifier which corrects for both lithologic and porosity variation from that expected of shale.

Figure 3:
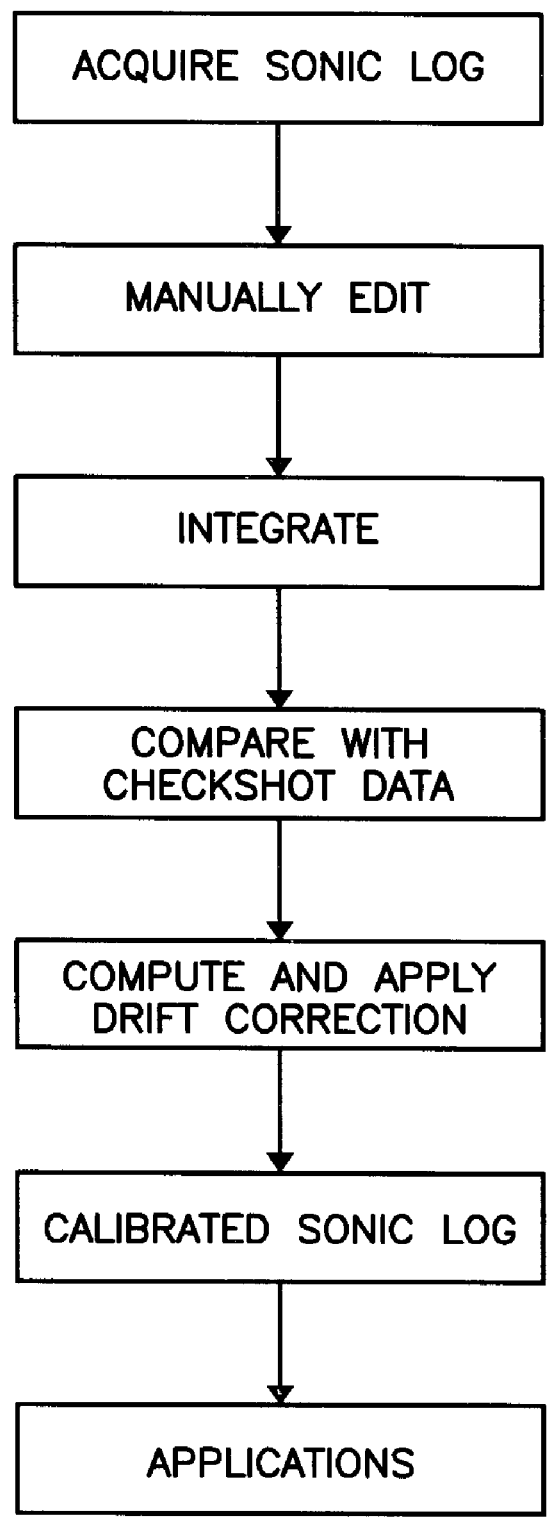
FIG. 3 is a flow chart of a prior art method of sonic log calibration.
Figure 4:
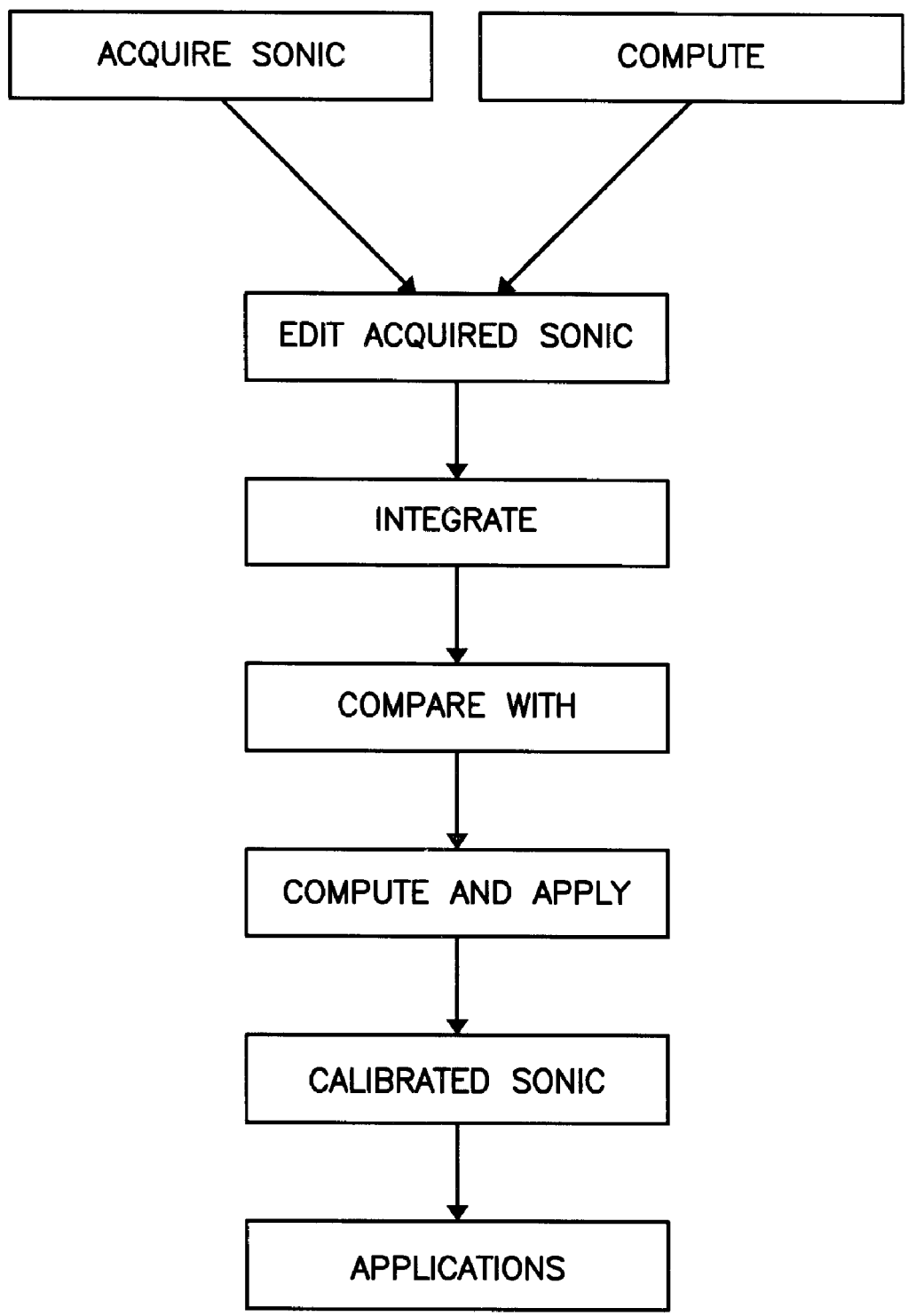
FIG. 4 is a flow chart of the method of sonic log calibration of the invention.

The substitution of theoretical sonic for acquired sonic in intervals is at present done by skilled interpreters following the steps shown in FIG. 3. Where the observed sonic departs from the theoretical, this departure is most commonly due to signal detection misinterpretation in the sonic logging tool or surface recording equipment. The output of is a calibrated sonic log that can be used in applications.

The process of the invention begins by computing a suitable synthetic sonic log.

The checking process is a standard well logging technique. A sound pulse is injected into the near surface, and a travel time to a fixed depth is precisely measured. This can be repeated at numerous points down a well, and in this way a precise velocity profile of the rock sequence can be acquired. This profile should closely match the short-interval data collected from the well bore (the sonic log) but rarely matches acceptably, because (at least in part) of noise inherent in the log acquisition process.

The checkshot data is considered to be more reliable (much lower error percentages), and the sonic log data is therefore adjusted (usually by bulk shift) to force integrated sonic times to match the observed checkshot times.

In this process, the value in the invention lies in the ability to substitute a petrophysically reasoned synthetic for the acquired sonic where the acquired data is in any way suspect, prior to the bulk shift forcing of the sonic to fit the checkshot data.

The compactive constant k is first determined for each major genetic sequence increment. This can be achieved by use of point density data (from either core or log) to solve the Korvin density function (equation (1) above) for k. Departures from the expected shale compactive trend usually arise from density reductions due to inclusion of low density materials (water, organic carbon); these produce erroneously high estimates of k. If sufficient data are available, a number of determinations should be made within each major sequence increment, and the minimum observed value should be chosen for k.

Within a sequence increment and a single geologic domain it can be expected that variations in k are systematic and mappable. This is certainly the case on a field scale. If we gather and map data for k, we should subsequently be able to estimate k for each sequence increment, removing the need for density data.

Having established values for k, we then proceed to estimate the modulus function, $(\lambda+2\mu)$. If sufficient data are available, taking observed $\Delta T$ from intervals of reliable sonic data in shales, we solve equation (4) above for $(\lambda+2\mu)$ at a number of points throughout the sequence, and interpolate between points to give a continuous estimate of $(\lambda+2\mu)$ versus depth.

Now having established the distribution of k and $(\lambda+2\mu)$, solve equation (4) for $\Delta T_{Shale}$ at any depth. Identify intervals of cleaner shale from the resistivity and any other available logs, and extract values of shale resistivity at these points. Use the point data to continuously estimate shale resistivity by linear interpolation. Then apply standard resistivity to porosity and porosity to $\Delta T$ transform techniques to compute a continuous resistivity difference function, using the shale and general formation resistivities, to modify the shale velocity and arrive at a mixed formation velocity, as detailed in equations 10, 11 and 12 above.

This is not necessarily the only approach, but there are powerful practical reasons for using it—robust compactive relationships have not been established for non-shale lithologies. Also, in many wells, particularly pre-1960's wells logged with western technology, and most wells logged using Russian technology, wireline data may not be sufficient to permit acceptable lithologic definition using existing techniques. However, in such wells there is generally sufficient core data to yield shale bulk density data over sufficient of the sequence to permit the solution of the Korvin shale density equation for k. There is also usually a basic resistivity log. If the modulus function is estimated, on regional geologic and lithologic grounds, a theoretical sonic log can be computed. Then a synthetic seismogram can be generated, and it can be correlated with observed seismic data. Subsequently the modulus function is reprocessed and iteratively refined to better the estimate of the modulus function until there is acceptable agreement with the observed seismic.

When considering noise removal and re-computation of acquired sonic data, by using the above techniques, a continuous synthetic sonic log can be generated which conforms closely to the observed sonic over intervals where there is confidence in the acquired data. We can then systematically and optimally merge the two data sets to produce an optimized sonic, which can then be calibrated to the check-shot data in the normal manner. Because we have replaced the observed data, wherever it is suspect, with data systematically computed on a mathematically and physically valid model, we can expect the resultant composite data to be superior to the raw acquired data.

We can (and do) systematically check the acceptability of the output by over-plotting an independent porosity indicator (the neutron porosity) on top of the optimized sonic plot. Correlation is generally excellent. This is a better technique than cross-plotting, since depth-paired data are more readily identified.

Shear Wave Velocity Estimation

From $$Vp = \left[\frac{\lambda + 2\mu}{p}\right]^{\frac{1}{2}} \text{ and } Vs = \left(\frac{\mu}{p}\right)^{\frac{1}{2}}$$

we can establish that $$\frac{Vp}{Vs}$$

is independent of density, and, it seems, does not vary greatly within each lithology (Gorbachev, Yuri I., 1995 Well logging: Fundamentals of methods: John Wiley and Sons, 324 p). If we can establish the lithotype mix, and we have superior Vp data, we should also be able to compute an improved Vs (Xu, Shiyu and White, Roy E, 1996, A physical model for shear-wave velocity prediction: Geophysical Prospecting, v. 44, p. 643–686).

Since the modulus function ($\lambda+2\mu$) is a mixed term, we cannot extract unique values for the components, and we expect the components to vary with lithologic variation.

Where hydrocarbons are present, and hole conditions are acceptable but the sonic log is unreliable, an alternative approach is to compute porosity from the density log, then transform this porosity into a theoretical ΔT and replace data over the suspect interval. The approach also cannot be used in coal-bearing sequences. In general, coals show high resistivities with distinctively slow velocities. Acceptable modelling of ΔT in coally sequences requires a mixed-lithology model.

If an alternative and reliable porosity log is available, and sonic quality is poor (eg due to gas entrained in the drilling mud), a derived porosity (eg neutron-density) can be substituted in equation (6) above, and solved for ΔT. (If gas is present, the neutron porosity is also affected and cannot be used without prior correction.)

Implementation

There are four elements to implementation of the above method.

A log data input system. This module takes data in effectively any form (Log ASCII standard, Log information standard, Digital log interchange standard, various ASCII forms including non-regularly sampled data), and delivers regularly sampled, uniformly formatted data to the mathematical processing engine.

A mathematical parser and processor. The user is able to enter algorithms in simple algebraic form, and to process the data into new log forms.

Capacity to build and reference look-up tables. This includes the ability to control critical paramaters over specific depth ranges, through reference to look-up tables and to apply various interpolation schemes to these parameters. Thus the precise form and sequence of algorithms and the inter-relationship of models is flexible, and can be controlled by the user. The result is a powerful and flexible interpretative computational engine.

A data output system. The products of processing are output in the above standard log file formats and can be displayed within the software or output to files for use in other display or application modules.

The technique can be used to improve the quality of acquired compression wave sonic data by selective replacement of intervals of poor quality or absent data. Where there is reliable sonic log data in the overlying and underlying rocks, Korvin's compaction constant k can be determined from bulk density data. The slowness equation can then be solved for the mixed elasticity function. These data are then used to generate the expected shale velocity through the interval of interest, and resistivity data are used to generate the desired composite compression ΔT. The generated data then replaced the poor quality or absent data over the interval of interest.

Figure 5:
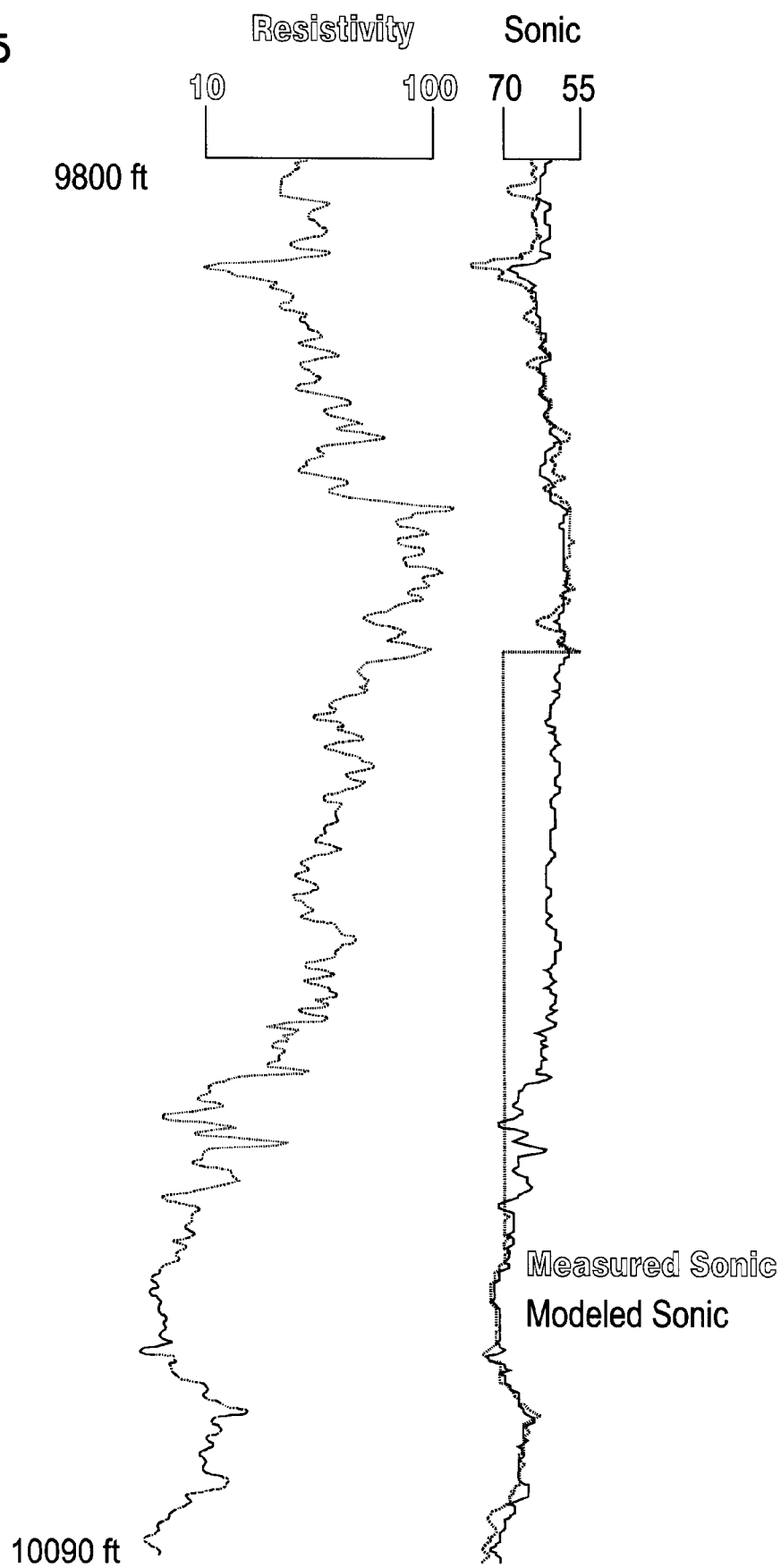
FIG. 5 shows resistivity data, acquired sonic log and a modelled sonic log from the Waihapa 2 well.

In Waihapa 2 (onshore Taranaki Basin, New Zealand), between 9902 feet and 10017 feet, both regular and long spaced sonic signals are meaningless (FIG. 5). Other logs across the interval are considered reliable, and the hole is near-gauge. Since the indicated porosities in the surrounding section are relatively low, the Wyllie time-average transform is used to convert resistivity-based porosity into a slowness component, which is then added to the Korvin-based shale slowness, to arrive at a composite slowness for the missing section. FIG. 5 shows the computed data plotted versus other data. There is good agreement between the acquired ΔT and that computed, over the section above and below the interval of interest.

In Trulek 1 (offshore, Timor Sea, western Undan-Bayu field, Australia), long intervals of the acquired sonic log data are suspect (FIG. 6). Using the combination of Korvin shale compaction and wireline log resistivity-porosity transforms, it is possible to generate a computer slowness curve which shows good agreement (FIG. 7) with the acquired data over long intervals where the acquired sonic is considered reliable. The comparison suggests we can have reasonable confidence in the computer slowness where comparative data is not available.

Figure 8:
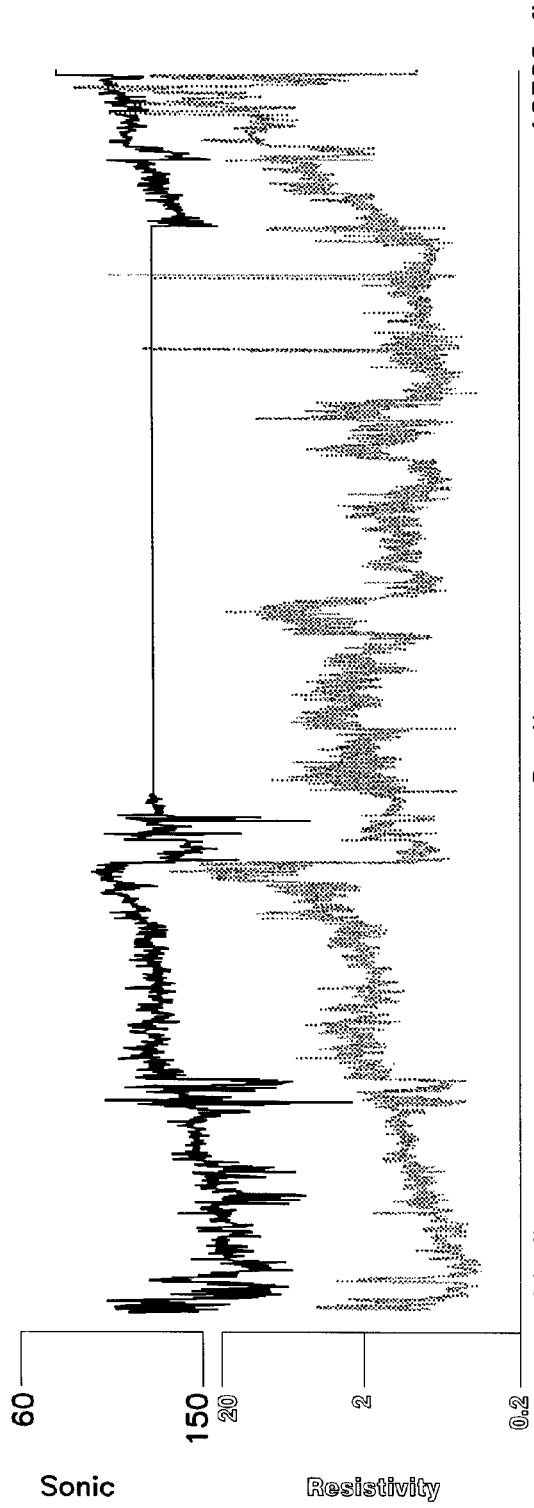
FIG. 8 shows acquired sonic data for the Bayu 3 well.
Figure 9:
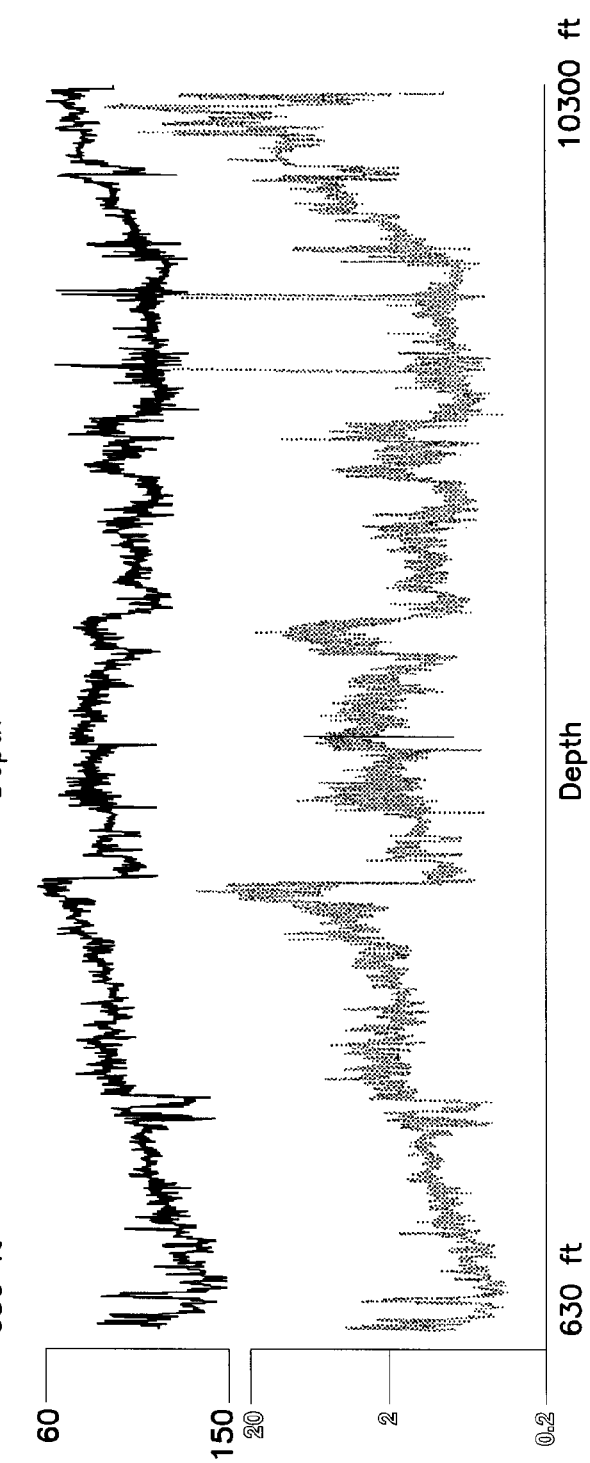
FIG. 9 shows modelled sonic data for the well of FIG. 8.

In Bayu 3 (Undan-Bayu field, Timor Sea, Australia) there is a long interval over which no openhole log data is acquired as a result of difficult drilling conditions (FIG. 8). Using measurement-while-drilling data, it is possible to generate a computed slowness curve to infill the interval where sonic data is absent (FIG. 9).

OTHER APPLICATIONS.

A sonic log model which is both theoretically valid, and of demonstrated practicality, has very wide potential application in the geological and geophysical sciences. The algorithm describes compaction, and can be inverted to yield both erosional losses and de-compacted thickness at prior times in the evolution of a basin sequence. This has potentially great significance in modelling hydrocarbon systems and migration pathways associated with peak migration episodes for these systems.

Where shale pore pressures are known (eg from drilling measurement), shale departure from the expected compactive trend-line to lesser density can be interpreted quantitatively in terms of organic carbon content. We are presently gathering chemical analytical data to permit systematic interpretation of sonic data in these terms.

The constant k should be systematically mappable across basins, for each major genetically related sediment package. Once so mapped, such data should considerably refine present time-depth conversion procedures based on seismic. When even scattered data are present, better regional seismic interpretations should be possible.

The relationship between rock sequence age, thermal history, and maturation is of fundamental importance to modelling of hydrocarbon generation and primary migration. We expect an empirical correlation, if not a causative analytical link, between shale density and ΔT, and observed levels of organic metamorphism.

Systematic estimation and mapping of the modulus function ($\lambda+2\mu$) should significantly improve our ability to interpret seismic data.

A new model describing systematic changes in shale density and acoustic performance with depth of burial has been established. This model is based on physical and mathematical analysis, is not empirical, has few constraints, and yields results which appear superior to those of previously published models. When applied to field acoustic log data, this model gives significant improvements in log data quality. Editorial improvement of the sonic log quality, conducted in this manner, yields a log which is no worse than the original, and may be vastly superior for purposes of seismic study. The edited log should then be subject to normal calibration before use in seismic studies.

The model has potential for diverse and very significant applications in basins analyses and study of hydrocarbon systems.

The underlying mathematical-physical model has far-reaching implications for study of sedimentary sequences, hydrocarbons systems and whole basin analyses.

Sequence compaction and acoustic wave propagation theory, supported by sonic and other log data from several thousand wells in a number of Australasian sedimentary basins, have led to the development of an alternative method of editorial enhancement of sonic log data. The technique and derivative concepts have potentially far-reaching applications in basin study and basin analysis.

Areas of application include, but are not limited to:

1. Computation of theoretical sonic data to replace intervals where acquired data is either noisy or absent. This leads to improved sonic log quality, yielding improved well to regional seismic ties.
2. Improved interpretation of seismic data in terms of seismic time to depth conversion.
3. Theoretical de-compaction of sequences, allowing improved reconstruction of basin geometry at prior times in the earth's history.
4. Interpretation of improved sonic data in terms of rock reservoir properties, yielding better understanding of reservoir performance, with improved exploitation economies and better total recoveries from known fields.

All the above are each quite large areas of commercial activity.

Throughout the specification the aim has been to describe the preferred embodiments of the invention without limiting the invention to any one embodiment or specific collection of features.

I claim:

1. A method of computing a theoretical sonic log $\Delta T_{Fmn}$ including the steps of:

computing an ideal theoretical shale sonic log $\Delta T_{Shale}$; and correcting the ideal theoretical shale sonic log with measured resistivity data using the relation $\Delta T_{Fmn} = \Delta T_{Shale} + [F(R)]$ where F(R) is a selected resistivity function.

2. The method of claim 1 wherein the resistivity function is calculated from $[F''(R_t) - F''(R_{Shale})]$ where $R_t$ is measured resistivity and $R_{Shale}$ is shale resistivity.

3. The method of claim 1 wherein the selected resistivity function is:

$$F(R) = C \cdot (\Delta T_{fl} - \Delta T_{ma}) \cdot (aS^{-n}R_w)^{\frac{1}{m}} \cdot \left[\left(\frac{1}{R_t}\right)^{\frac{1}{m}} - \left(\frac{1}{R_{Shale}}\right)^{\frac{1}{m}}\right].$$

4. The method of claim 1 wherein the selected resistivity function is:

$$F(R) = \Delta T_{ma} \cdot \left[\frac{1}{\left(1 - \frac{1}{C'}\left(aS^{-n}\frac{R_w}{R_t}\right)^{\frac{1}{m}}\right)} - \frac{1}{\left(1 - \frac{1}{C'}\left(aS^{-n}\frac{R_w}{R_{Shale}}\right)^{\frac{1}{m}}\right)}\right].$$

5. The method of claim 1 wherein the selected resistivity function is:

$$F(R) = \Delta T_{ma} \cdot \left[\frac{1}{\left(1 - \left(aS^{-n}\frac{R_w}{R_t}\right)^{\frac{1}{m}}\right)^x} - \frac{1}{\left(1 - \left(aS^{-n}\frac{R_w}{R_{Shale}}\right)^{\frac{1}{m}}\right)^x}\right].$$

6. The method of claim 1 wherein the ideal theoretical sonic log $\Delta T_{shale}$ is computed from $$\Delta T(shale) = \left[\frac{[(A*\Delta T_\infty^2) + (B*\Delta T_o^2 - A*\Delta T_\infty^2)e^{Kz}]}{(\lambda_z + 2\mu_z)}\right]^{\frac{1}{2}}$$

where z is depth, $\Delta T_o$ is interval transit time at depositional surface, $\Delta T_\infty$ is interval transit time at great depth, $\lambda_z+2\mu_z$ is an elasticity term, A and B are constants and k is a constant.

7. The method of claim 6 wherein k is computed by solving $$\rho(z) = \rho_\infty + (\rho_0 - \rho_\infty)e^{-kz}$$

using point density data.

8. The method of claim 7 wherein the point density data is derived from core measurements.

9. The method of claim 6 wherein $\lambda_z+2\mu_z$ is estimated by solving $$\lambda_z + 2\mu_z = \frac{A\Delta T_\infty^2 + (B\Delta T_0^2 - A\Delta T_\infty^2)e^{-kz}}{\Delta T_{(z)}^2}$$

using $\Delta T_{(z)}$ at known depth (z).

10. The method of claim 1 wherein F(R) is calculated from measured resistivity data using $F(R) = F(R_t) - F(R_{shale})$ where $F(R_t)$ is a function of measured formation resistivity and $F(R_{shale})$ is a function of measured and interpolated shale resistivity.

11. The method of claim 10 wherein $F(R_{shale})$ is calculated using interpolation between points of observed shale resistivity.

12. A method of computing a synthetic sonic log including the steps of:

calculating a compactive constant k;
   estimating a modulus function ($\lambda+2\mu$) as a function of depth using the constant k and reliable observations of interval transit time ($\Delta T$);
   calculating the shale interval transit time $\Delta T_{Shale}$;
   calculating a resistivity modifier term F(R);
   adding the resistivity modifier term to the shale interval transit time to produce the synthetic sonic log.

13. The method of claim 12 wherein the compactive constant k is determined from point density data by solving $$\rho(z) = \rho_\infty + (\rho_0 - \rho_\infty)e^{-kz}.$$

14. The method of claim 12 wherein the step of estimating the modulus function $(\lambda+2\mu)$ is performed by solving $$\Delta T(z)^2 *(\lambda_z+2\mu_z)=(A*\Delta T_\infty^2)+(B*\Delta T_0^2-A*\Delta T_\infty^2)e^{-kz}$$

by substituting with observed $\Delta T(z)$ at various z and interpolating between calculations.

15. The method of claim 12 wherein the step of calculating the shale interval transit time $\Delta T_{shale}$ is performed by solving $$\Delta T(z) = \left[\frac{[(A*\Delta T_\infty^2)+(B*\Delta T_o^2-A*\Delta T_\infty^2)e^{Kz}]}{(\lambda_z+2\mu_z)}\right]^{\frac{1}{2}}.$$

16. A method of calibrating an acquired sonic log including the steps of:

computing a theoretical sonic log $\Delta T_{Fmn}$;

comparing the theoretical sonic log to high confidence regions of the acquired sonic log;

modifying the theoretical sonic log to correlate with said high confidence regions;

substituting the theoretical sonic log for the acquired sonic log in regions other than the high confidence regions.

17. The method of claim 16 wherein the theoretical sonic log is of the form $\Delta T_{Fmn}=\Delta T_{Shale}+[F(R)]$ where $\Delta T_{shale}$ is an ideal theoretical shale sonic log and $F(R)$ is a selected resistivity function.

* * * * *